US012562994B2

(12) United States Patent
Wertheimer et al.

(10) Patent No.: US 12,562,994 B2
(45) Date of Patent: Feb. 24, 2026

(54) TIME SYNCHRONIZED COLLECTIVE COMMUNICATION

(71) Applicant: MELLANOX TECHNOLOGIES, LTD., Yokneam (IL)

(72) Inventors: Zsolt Alon Wertheimer, Haifa (IL); Omer Shabtai, Tel Aviv (IL); Barak Goldberg, Moshav Dishon (IL); Lion Levi, Yavne (IL); Gil Mey-Tal, Tel Aviv (IL); Bar Or Shapira, Tel Aviv (IL); Dotan David Levi, Kiryat Motzkin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 380 days.

(21) Appl. No.: 17/886,606

(22) Filed: Aug. 12, 2022

(65) Prior Publication Data

US 2024/0056400 A1 Feb. 15, 2024

(51) Int. Cl.
H04L 47/56 (2022.01)
H04L 43/0894 (2022.01)

(52) U.S. Cl.
CPC .......... H04L 47/56 (2013.01); H04L 43/0894 (2013.01)

(58) Field of Classification Search
CPC ........................... H04L 47/56; H04L 43/0894
USPC ....................................................... 370/329
See application file for complete search history.

(56) References Cited

U.S. PATENT DOCUMENTS

| | | | |
|---|---|---|---|
| 10,284,383 B2 | 5/2019 | Bloch et al. | |
| 11,252,027 B2 | 2/2022 | Ben-Moshe et al. | |
| 2015/0281126 A1* | 10/2015 | Regula ..................... | H04L 67/55 709/212 |
| 2019/0386924 A1* | 12/2019 | Srinivasan ............ | H04L 47/122 |
| 2020/0106828 A1 | 4/2020 | Elias et al. | |
| 2020/0265043 A1 | 8/2020 | Graham et al. | |
| 2021/0117249 A1* | 4/2021 | Doshi ................. | H04L 67/1001 |

OTHER PUBLICATIONS

Bruck, et al., Efficient Algorithms for All-to-All Communications in Multiport Message-Passing Systems, IEEE Transactions on Parallel and Distributed Systems, vol. 8, No. 11, Nov. 1997 (Year: 1997).*
"MPI: A Message-Passing Interface Standard," University of Tennessee, Jun. 9, 2021, Version 4.0, 1139 pages.
(Continued)

*Primary Examiner* — Peter G Solinsky
(74) *Attorney, Agent, or Firm* — Sheridan Ross P.C.

(57) ABSTRACT

Systems, methods, and devices that perform computing operations are provided. In one example, a system includes a least one node, the at least one node having one or more processors, each having associated memory, a clock, a scheduler, the scheduler monitoring one or more of rates, rates of lanes, rates at which packets are sent, times, latencies of packets, topology, communication states, nodes, and packets in the system, an attribute monitor that measures counters for one or more of congestion state, line rate, and communication attributes. A packet scheduler determines a destination node based on information from the scheduler and the attribute monitor, and sends at least a portion of a packet to the destination node.

25 Claims, 9 Drawing Sheets

(56)  References Cited

OTHER PUBLICATIONS

Faraj et al. "Automatic Generation and Tuning of MPI Collective Communication Routines," ICS '05: Proceedings of the 19th annual international conference on Supercomputing, Jun. 2005, pp. 393-402.

Zheng et al. "Simulation of the performance and scalability of message passing interface (MPI) communications of atmospheric models running on exascale supercomputers," Geoscientific Model Development, Aug. 2018, vol. 11, No. 8, pp. 3409-3426.

* cited by examiner

Time
Network State
Message Size
Destination
Topology
Congestion State
Rates of Lanes
Rates at which Packets are Sent
Packet Latency
Communication State
Node Information
Packet Information
Communication Attributes

Fig. 8

TIME SYNCHRONIZED COLLECTIVE COMMUNICATION

FIELD OF THE DISCLOSURE

This disclosure is generally directed toward collective communication, and in particular, to improving collective communication and processing through time-synchronization and an associated predictive and intelligent scheduling of packets.

BACKGROUND

Distributed communication algorithms, such as collective operations and collective communications, distribute work amongst a group of communication endpoints or nodes, such as processes. Collective operations face the challenge of having different endpoints (processes) entering the operation at different times, perhaps as the result of load imbalance in the compute portion of the application invoking these algorithms. Members of the collective participating in distributed algorithms may rely on receiving data from other members as a prerequisite for their work. As a result, a late arriving data set from an endpoint may delay progress of other members of the group from performing their operations. This can lead to inefficiencies and increased network congestion.

BRIEF SUMMARY

Modern computing and storage infrastructure use distributed systems to increase scalability and performance. Common uses for such distributed systems include: datacenter applications, distributed storage systems, and High Performance Computing (HPC) clusters running parallel applications. While HPC and datacenter applications use different methods to implement distributed systems, both perform parallel computation on a large number of networked compute nodes with aggregation of partial results from the nodes into a global result. Many datacenter applications such as search and query processing, deep learning, graph and stream processing typically follow a partition-aggregation pattern that uses these concepts.

Collective communication such as all-to-all and all-gather is very popular and widely utilized in High Performance Computing (HPC) and Artificial Intelligence (AI) systems. This is especially true with the introduction of large transformer models which introduced large, distributed model training. Such communication schemes are very complex and naturally create high load throughout the network of connected nodes/processes as the data transfer increases.

In both collective and other concurrent flows in the network of interconnected nodes/processes, one objective is to reduce network load to in turn reduce performance impact and therefore improve completion times of each process. As mentioned, since some nodes may have to wait to perform their process for another node to complete its process, improving (and synchronizing) completion times can lead to a reduction in this wait time, can reduce overall system inefficiencies, can reduce buffer utilization, and can reduce network congestion, just to name a few. Consequently, a solution has been designed to improve the operation of a collective communication system such that a reduced or minimized network signature is maintained, which is challenging in these complex environments.

In a distributed environment, multi-node processes execute collective communication flows in which data is exchanged between a group of participants. Most of those communications participants start the flows at different times, in an unsynchronized manner. When the data exchange starts, each node has an ordering of a set of destinations and their messages to be sent and received. During the transaction with the other participants, packets of data stream through the network dispatched from sources to destinations, traversing through the switches and cables, creating a load on the network.

The ordering and message sizes defined by many different software and hardware algorithms at the various process in the system have as one objective to exchange data without causing collisions of messages that are destined for the same destination. This occurs between all the participants. However, since the nodes are poorly or non-synchronized in time, many packets can be sent at the same time from multiple sources to the same destination creating congestion and a performance impact that reduces transmission rate.

Other solutions have been to address such collisions by either creating buffers to store the additional data (adding complexity and cost) or adding waiting times (slowing the entire system) to finish a fixed number of send and receive operations at each step of the communication flow. The first solution of creating buffers can be useful on small messages but in today's High Performance Computing systems, the typical message sizes quickly overflow the buffers.

On the other hand, the second solution of adding wait times reduces the load on the network by some factor, and provides a loose synchronization, but finish times tend to increase because of unused time for transmission and processing that is created by the wait for synchronization. This overall system delay is not wanted in HPC environments. This software synchronization can be slow in today's High Performance Computing environment.

One aspect of the technical solution described herein maintains fast completion times with minimal disruption to other nodes in the system.

One additional aspect provides a faster and scalable collective communication architecture using time synchronization protocols (such as PTP (although others are possible)), topology awareness, and congestion awareness for packet scheduling and sending. The exemplary technical solution incorporates an optimized utilization of transactions that can be applied in any network environment, and can speed up all High-Performance Computing and AI applications (and the like) that use multi-node clusters.

One exemplary feature is the defining of a time dependent schedule that provides for robust node start time noise, which can eliminate barriers, helps maintain low buffers, reduces network congestions, and improves buffer utilization with reduced buffer signatures.

Embodiments of the present disclosure aim to improve the overall efficiency and speed with which collective operations are performed by synchronizing nodes in the system to single packet times and by using prediction to assist with packet distribution.

Illustratively, and without limitation, a system is disclosed herein to include: one or more processing circuits that receive and process data as part of a collective that is organized into a group of interconnected or networked nodes. Information about the collective is utilized by each node to determine a size of a message, a time slot and a destination for a packet of data to be sent.

FIG. 1 provides an illustrative comparative analysis between a non-synchronized collective, a semi-synchronized collective and a synchronized collective utilizing the exemplary techniques disclosed herein. In FIG. 1, it can be seen that processes in the one-sided or non-synchronized example are not synchronized with their respective time-slots, and process can occur outside a designated time-slot which is one reason why the prior solutions mentioned above introduce a delay. With the synchronized technique, data packs can be synchronized with an associated time-slot and processed within the same. Stalls or delays, which will be discussed later, can help with ensuring the synchronized data packets are processed within their designated time-slot. While the semi-synchronized example does offer some improvements over the non-synchronized example, data is still not completely synchronized with the associated time slot and inefficiencies result.

Accordingly, exemplary advantages and features of the disclosed solution allow for differing network loads. As shown in FIG. 1 for the non-synchronized solution, each node/process has its own living time, performs its calculation and send the result to a destination without accounting for any time synchronization. One reason for this solution is that it is difficult to synchronize distributed applications in the time domain. However, one problem is that it is not known to which destination (node) the data is sent to, and there is no account for traffic in the system. The destination could have a full buffer, or could be receiving packets from other nodes in the system which lead to inefficiencies, collisions, delays, and the like.

One exemplary feature addresses these challenges by making a time-dependent decision regarding a destination for a packet. This can at least reduce network loads, improve synchronization, and boost performance. More specifically, the solution can improve buffer performance, in contrast to prior solutions that can lengthen completion times because processes wait for a last node to complete before proceeding. Another advantage is that an overall reduction of communications traffic within the system can be achieved since each node in the system is able to accurately determine a time slot for transmission of a packet portion based on one or more inputs about the state of the system.

This can be achieved by quantizing time to slots, and having each node synchronize to a global clock. Then, each node can evaluate one or more of the inputs discussed herein to determine a best fit for a packet or chunk of data in terms of a destination node and a time slot. And this can be accomplished even if it is desired to start in the middle of time slot or if the topology shifts or changes.

Time (via synchronization) is used to manage the entire flow and align the nodes in a more efficient manner and to decide, at a first instance, a schedule of events for a collective scheme of events. As will be discussed, time and network topology can be used to make send decisions and coordinate the collective operations. Window slots can be numbered and each number can identify which destination the chunk of data can be sent to. Entire slots can be filled, or only partially filled, by sending partial messages, and data can be restricted such that it is only sent to allowed destinations. This helps address one of the challenges of prior systems where delay was introduced since nodes may not be able to use the result data until a entire data sequence from the collective was complete. By optimizing the flow of data, a more uniform, efficient, and optimized system is created.

Since time (synchronization) is used as the foundation for collective operations, the entire flow of the system is aligned with time through synchronizing with a global clock. This is supplemented with information about the fabric state, e.g., topology, being taken into consideration for scheduling packet (e.g., latencies) within the system where test packets can be sent to map latencies within the network/system and used as an input for the send process determination.

In some embodiments, and due to the latest advancement in time synchronization protocols, a system of nodes can be synchronized to single packet times. Unlike prior solutions which used barriers (buffers, delay, etc.) to achieve synchronization of nodes, some embodiments provide a time-based solution that does not require these barriers. This is yet another improvement since one drawback of these techniques is generating jitter since the response from the different nodes doesn't arrive at the same time.

In some embodiments, the system can also leverage a Network Interface Card's (NICs) or SmartNICs scheduler feature which enables planning the communication based on the knowledge of one or more of the rates, latencies, topology, network states and configurations of the nodes in the system. As will be appreciated, one or more of the systems disclosed herein could be consolidated into a NIC or SmartNIC and utilized in accordance with the methods disclosed herein.

Given a set of communication nodes, and the data to be exchanged, the system can schedule and plan the ordering, sizes to send and receive, and adjust rates for slow and fast operating nodes which can at least prevent collisions, reduce performance impact and isolate the nodes. The send algorithm of each node has knowledge of the time and which destination is available since all the nodes are aware of this information and have knowledge about the order of send, receive in time and the topology.

In some embodiments, each node at the beginning of the communication flow measures time and the state of the network which at least includes the message size, destination, topology, congestion state, line rates latencies, etc., and the node sends the amount of data that best utilizes the available time slot in terms of performance and minimal load on the network. After each finished transaction, the node checks the time and calculates, according to the states described earlier, the transmission to be executed in the currently available time slot.

The different exemplary configurations described include the slot sizes in time per distance, fragmentation of the message to be sent for best performance, stall times needed for stabilizing the system in case of exceeded load, scheduling offsets for different topologies and/or the rate of feedback from the network.

This disclosure provides multiple different implementation options that exhibit the dynamic collaboration between the software and hardware in a collective system.

In some embodiments, each node in the network fetches the time and network state before each transaction or at predefined/predetermined stages. Time acquisition can be executed through a software-based application and frameworks from a system clock or using the NIC hardware clock directly with an appropriate interface.

In the next stage, and given the time measurement, the node (appreciating this is done at all nodes) measures the counters or obtains information for the congestion state, line rate and additional network attributes to be used in the destination node selection and the message transmission conditions definition. The measurement of the counters can be either executed by, for example, a software interface and/or a framework for reading directly from one or more hardware components.

Next, the measured time and network attributes are used to determine the destination based on the time slot and topology, while the message size, scheduled time of transmit and rate to be transmitted are based on network conditions such as congestion, routing and buffer utilization in the network. The determination can be executed through a software framework and/or a hardware component(s) that yields the desired results from the acquired counters.

Once the above determinations are complete, scheduling is invoked to trigger the hardware to send the message(s) depending on the determined features and attributes. Software can calculate the features of the system while the hardware executing the time-aware scheduling of sending all or part of the messages described in earlier steps can be performed using counters and network conditions.

The system can use these counters and network conditions to transmit messages with a pure hardware solution as an optional component in the system that measures, calculates features and executes the message exchange. One embodiment uses a NIC packet scheduling capability through either a software framework or a hardware component or a mixture of software invoking one or more hardware components.

All the steps above execute until all the messages to be sent reach their associated destination. This can be done while maintaining a balanced network load with optimized performance relative to any system condition.

The prior solutions assumed non-synchronized node configurations and non-time dependent implementations. The knowledge of time and the assumption that the participants have the same time stamp up to a known precision, is leveraged in the described solution to plan upfront the events contrary to the prior solutions which insert wait times and assumes asynchronous flows. Furthermore, reading the states of the network and prior knowledge of the system utilized in the scheduling, optimizes the technology to any system state. In prior solutions, lack of synchronization in time lead to lower performance in completion time and less efficient utilization of system components such as memory and buffers.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale:

FIG. 8 illustrates in greater detail a synchronized collective; and

DETAILED DESCRIPTION

Figure 1:
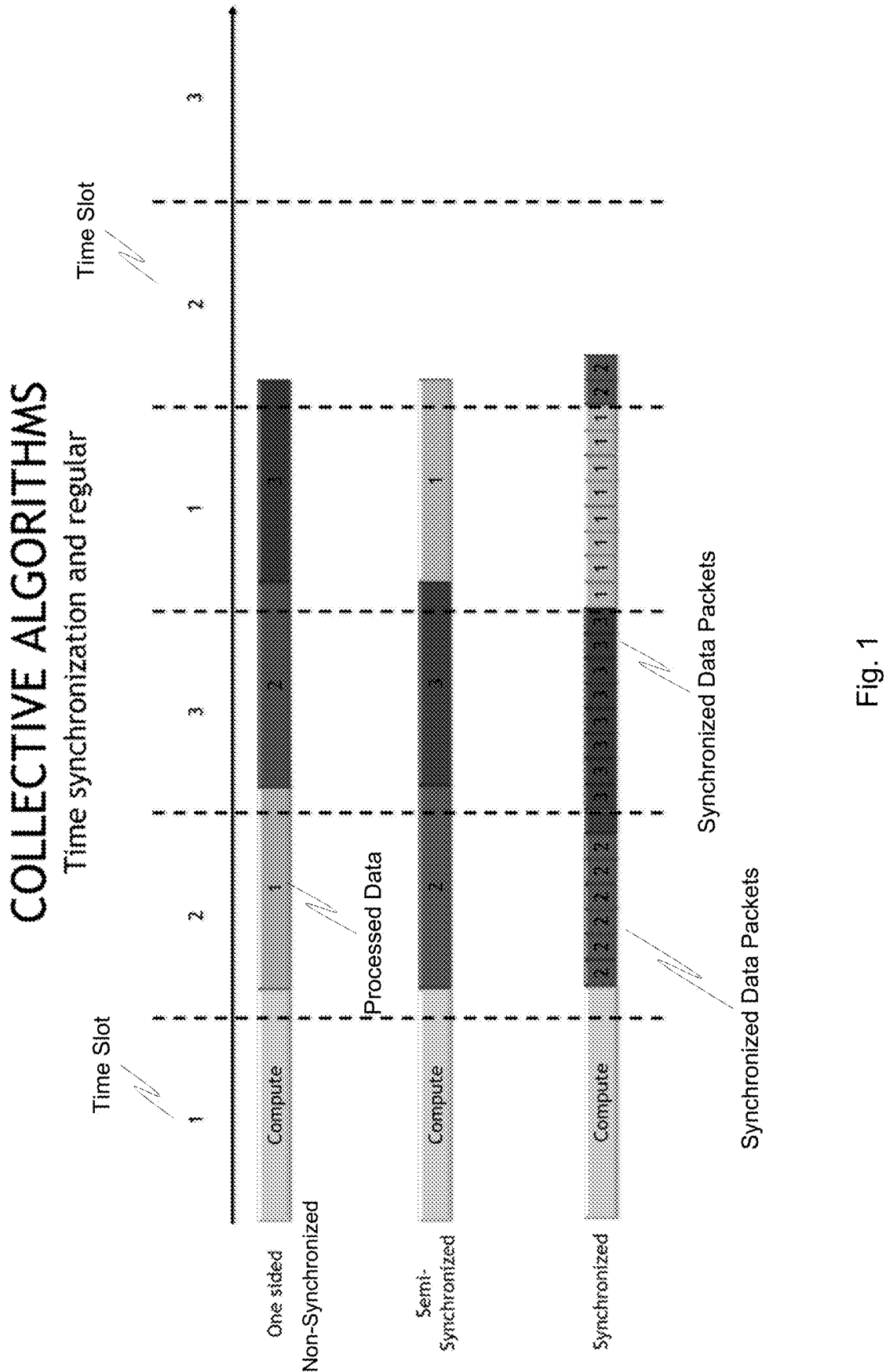
FIG. 1 is a comparative diagram between different collective configurations.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 2-9, various systems and methods for performing collective operations will be described in accordance with at least some embodiments of the present disclosure. While embodiments will be described in connection with particular operations, it should be appreciated that the concepts and features described herein can be applied to any number of operations. Indeed, the features described herein should not be construed as being limited to the particular types of collective operations depicted and described.

While concepts will be described herein with respect to certain inputs being utilized to determine a size and window for sending a data chunk, other inputs or combinations of inputs could be used to assist with improving collective efficiencies.

Figure 2:
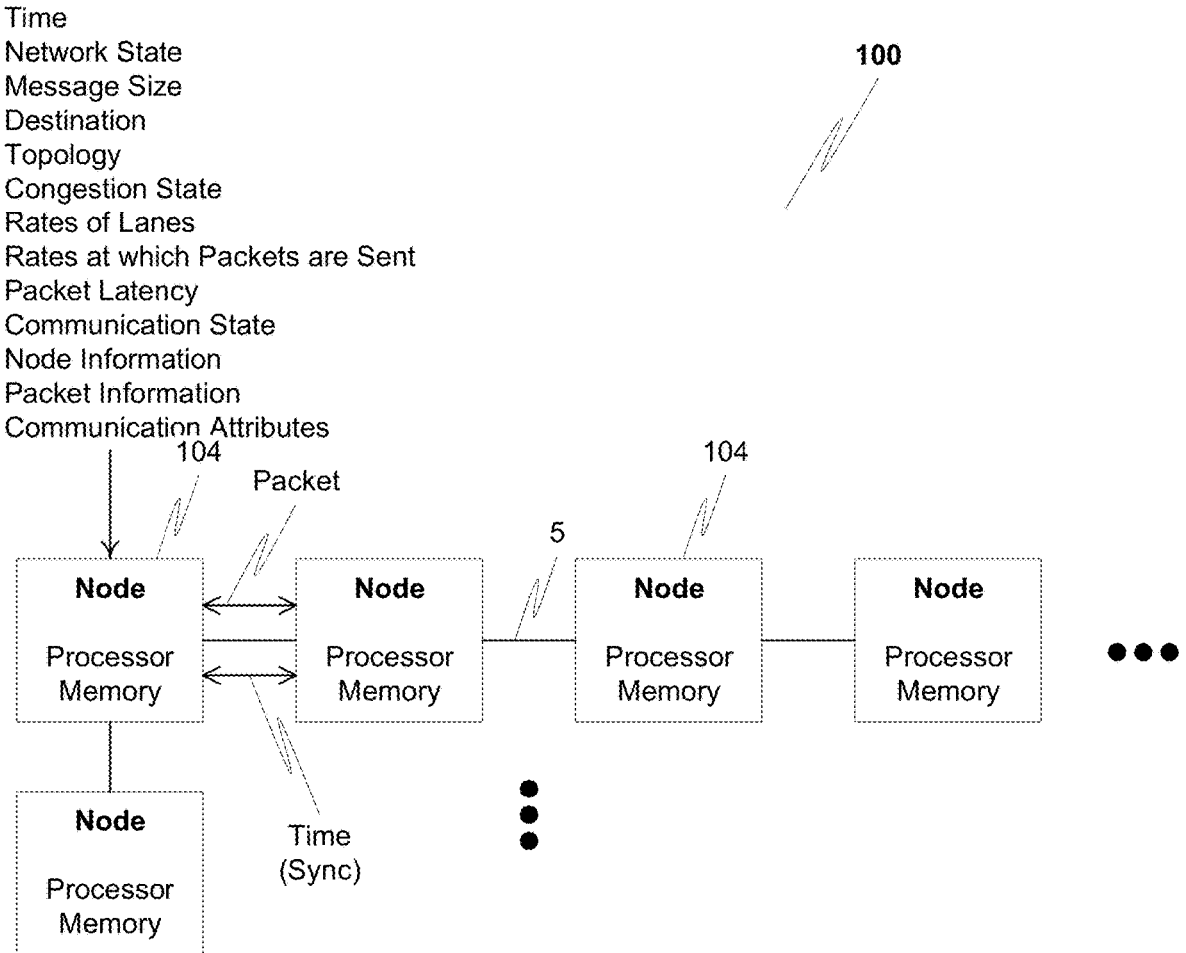
FIG. 2 is a block diagram of an exemplary collective including a plurality of interconnected nodes.

Referring initially to FIG. 2, an illustrative collective system 100 is shown in which members/processes/nodes 104 are organized into a collective. The collective shown in FIG. 2 includes multiple nodes 104 as well as other well-known devices (not shown) that all contribute computing resources to the collective. As will be discussed in greater detail, each node synchronizes to a global clock and receives as input information about the collective and the data. For example, each node 104 can receive or measure information such as one or more of rates, rates of lanes, rates at which packets are sent, times, latencies of packets, topology, communication states, nodes, and packets in the system. Additional information such as congestion state, line rate and communication attributes (such as packet information) can also be considered for the node to determine a destination node for the chunk of data. Once on or more of these metrics are evaluated, the chunk of data is sent to the chosen destination node.

Each node 104, via a link and port, synchronizes to a global clock to ensure each node is time-synchronized with each other node 104. While there can be any number of nodes in the collective, five exemplary nodes are illustrated with each node having a processor, memory and additional components as will be discussed in relation to FIG. 3.

Figure 3:
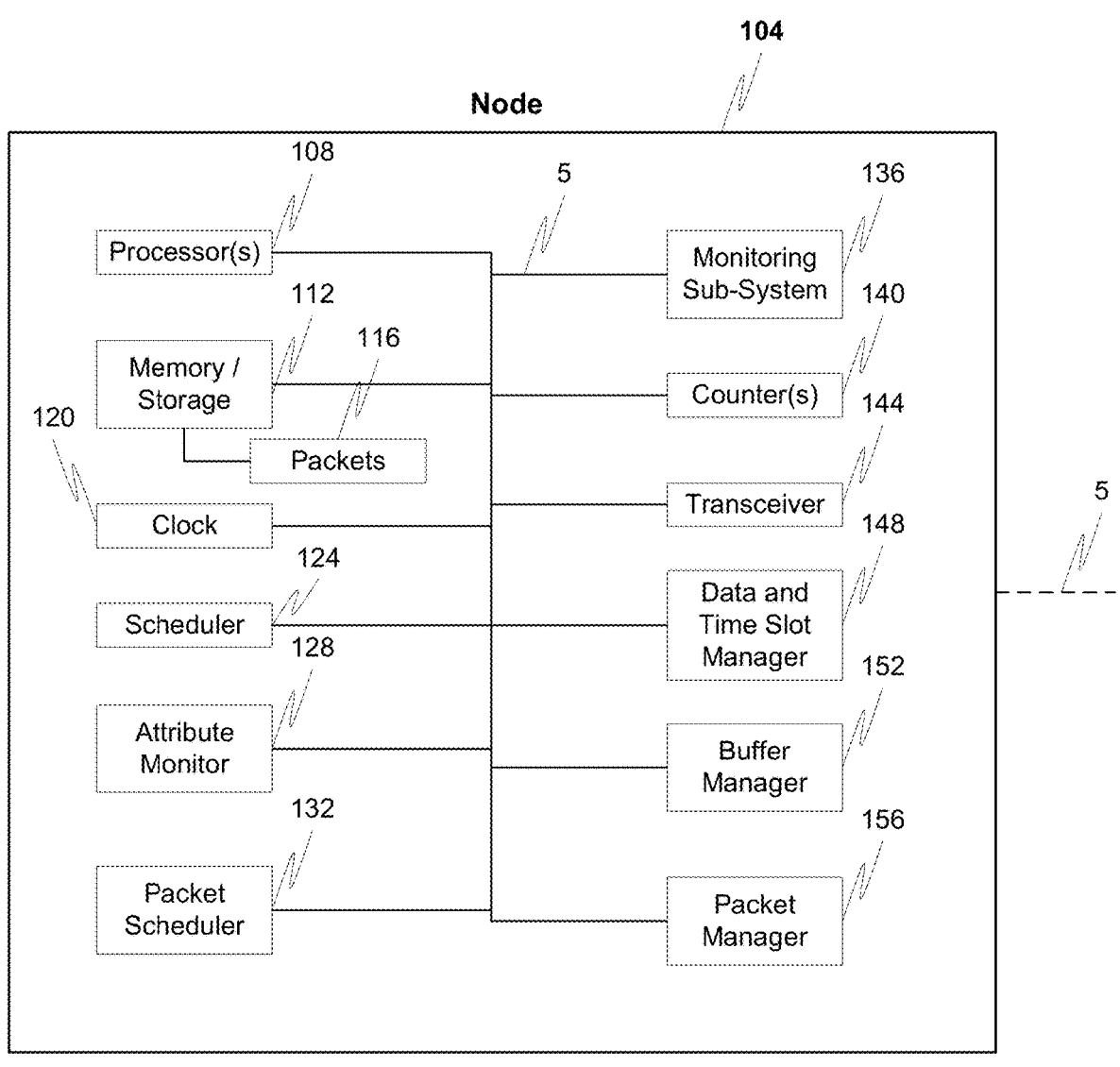
FIG. 3 is a more detailed block diagram of an exemplary node.

FIG. 3 illustrates in greater detail components of an exemplary node 104. Each node 104 is interconnected with other node(s) via link 5, such as a communications or data link, and the various elements within the node 104 are connected via a link 5 which can be, for example, a data bus.

In general, the processor 108 may include one or more Integrated Circuit (IC) chips, microprocessors, circuit boards, simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. The processor 108 may correspond to one or a plurality of Central Processing Units (CPUs), Graphics Processing Units (GPUs), Data Processing Units (DPUs), combinations thereof, and the like. Thus, while only a single processor 108 is shown in the node 104, it should be appreciated that the node 104 may include multiple processing units or differing types of processing units without departing from the scope of the present disclosure.

The memory 112 may include any number of types of memory devices. As an example, the memory 112 may include Random Access Memory (RAM), Read Only Memory (ROM), flash memory, Electronically-Erasable Programmable ROM (EEPROM), Dynamic RAM (DRAM), buffer memory, combinations thereof, and/or the like. The memory 112 is capable of at least storing data, such as packets or portions of packets and cooperating with one or more of the other elements in order to facilitate sending of information to a destination node as discussed herein.

Node 104 further includes a clock 120 that is synchronized to a global clock through known methods. Each node 104 uses the clock 120 to ensure each node within the collective is time-synchronized to each other node within the collective. Examples of clock synchronization methods include, but are not limited to: PTP (See IEEE 1588), SyncE (Synchronous Ethernet), and SyncE and PTP, and the time can be, for example, in wall clock format.

Scheduler 124 cooperates with the monitoring sub-system 136. In particular, the scheduler 124 and monitoring sub-system 136 monitor one or more of rates, such as rates of lanes, rates at which packets are sent, times, latencies of packets, topology of the collective, communication states of one or more of the nodes and communication state of the collective, nodes, packets in the system, etc., as tabled below. As will be discussed, this information is used by the packet scheduler 132 to send data (e.g., packets or chunks) to one or more other nodes in the collective.

The monitoring sub-system 136 is configured with a plurality of tools to perform the above measurements. The monitoring sub-system 136 can monitor any condition with the node, share this information with any other node(s) in the collective, and also monitor information or states of the various links in the system, as well as packet sending and receipt information.

The attribute monitor 128 measures counters (or comparable metrics) for one or more of congestion state, line rate, sync information, etc., as tabled below. These attributes can include any information about the collective and can include, but are not limited to, switch buffer level, number of pause frames, number of dropped packets, average packet size, maximum packet size, minimum packet size, buffer capacity and/or level, or in general any information about the interconnected components or information within the system. This information can then be used as to be discussed with selection of the destination node and message transmission characteristics.

The following table provides exemplary inputs that can be used alone or in combination with any other input(s) to determine the size and destination of the packet to be sent, with this information sharable with any one or more other node(s) within the system. The window size can also be managed (increased or decreased) based on one or more of the following metrics.

TABLE 1

| Communications Attributes: | Network Attributes: |
| --- | --- |
| Timing Information | Synchronization Information |
| Rates or Rates Of Lanes (e.g., Bandwidth Of Communication Channel(s)) | Time Slot Definitions |
| Rates At Which Packets Are Sent | Congestion State of one or more Nodes |
| Communication Information For The Collective | Node Information |

TABLE 1-continued

| Communications Attributes: | Network Attributes: |
|---|---|
| Buffer Utilization And/Or Capacity | Number of Dropped Packets |
| Communication State of one or more Nodes | Line Or Communication Rate |
| Any Communication Information about the Collective | Jitter, Ping Times, etc. |
| Packet Latency | Switch Buffer Level |
| Packet Information | Number of Pause Frames |
| Message Size/Packet Size | Average Packet Size, Maximum Packet Size, |
| Destination Information | Buffer Capacity or Level |
| Test Packet Information | Physical Topology or Changes in Topology |
| How many Unutilized Slots - Network Loading | Clock Information |
| Amount of Time Node is Out of Sync | Synchronization Information (e.g., is a node out of sync) |
| Existing Flow Information | Hardware Latency/Switch Latency/NIC Latency |
| Future Flow Information/ Application Information | NIC Buffer Utilization |
| Application Scheduling Information | NIC Burst Size |

The packet scheduler 132 cooperates with the memory 112, which stores packets 116, the buffer manager 152 and the packet manager 156 to coordinate sending of the packet via transceiver 144.

Counter 140 is configured to count or otherwise quantify one or more of the congestion state, line rate, and communication attributes, etc., with this information usable by the attribute monitor 128 to assist with selection of the destination node and message transmission characteristics, e.g., packet size, send lane, or the like, by the scheduler 124 and packet scheduler 132.

Transceiver 144 manages the sending of the information, such as packets or other information listed above, to other node(s), and receipt of information and/or packets from other node(s).

The data and time slot manager 148 manages an amount of data and a time slot for transmission of the at least the portion of the packet to be sent. The data and time slot manager 148 also coordinates collective communication in the system (and can optionally communicate with one or more other data and time slot managers) and defines one or more time slots for one or more destination nodes. More details of this functions will be explained in conjunction with the discussion of FIG. 9.

The buffer manager 152 cooperates with the memory 112 to manage buffer utilization for the packets to be sent. As discussed, buffer utilization can be used as one of the inputs to determine destination and time slot allocation for a data packet. The packet manager 156 can cooperate with any one or more of the other components to assist with the management of breaking a packet into smaller portions for sending (or reassembling packet fragments) in accordance with the determinations made by the packet scheduler 132 and data and time slot manager 148.

Exemplary operation of a node 104 will now be described in greater detail. Specifically, the clock 120 synchronizes itself with a global clock, as do all the other nodes in the collective. As mentioned, examples of clock synchronization techniques include, but are not limited to: PTP (see IEEE 1588), SyncE (Synchronous Ethernet), and SyncE and PTP. The clock 120 can update its internal clock based on the global clock signal sent in the used synchronization technique so the clock 120 is synchronized to the global clock.

Because each node synchronizes to the global clock, all nodes in the collective become synchronized indirectly with one another.

In preparation for collective communication, processor 108, memory 112, and packet scheduler 132 assign or otherwise define a time slot(s) per destination. Thus, packets or packet fragments sent within a defined timeslot will be sent to a specific destination node.

Once the time slots are defined by the data and time slot manager 148, the scheduler 124 and monitoring sub-system 136 acquire any one or more the values specified above in Table 1. This information can be stored in memory 112. In a similar manner, attribute monitor 128 acquires information about the network attributes with the collective such as congestion, line rate, etc., as also listed in Table 1. The packet scheduler 132 can also optionally take into consideration information from the buffer manager 152 regarding buffer utilization within the system.

To achieve the efficiency improvements mentioned herein, the packet scheduler 132 then determines a destination node for at least a portion of a packet based on the monitored information. For example, the packet scheduler 132 can choose a destination based on node availability, whether a buffer is below a certain capacity threshold, whether the packet should be sent in a high rate lane, whether the packet can fit within the identified time slot, or the like. In general, any combination of at least the information from Table 1 could be used to assist with making a destination node determination.

In conjunction with determined the time slot, the packet scheduler 132, packet manager 156, data and time slot manager 148, and memory 112 further cooperate to determine a size for the portion of the packet for transmission in the identified time slot. For example, this determination can be based on a time remaining until a next time slot, latency information, collective type, or the like.

Once the portion of the packet is transmitted by the transceiver 144, the processor 108 makes a check as to whether all portions of the packet have been sent. If all portions have been sent, the process can end, otherwise the process continues until all portions of the packet have been sent.

Stated another way, that various components in each node in the network fetch the time and network state before each transaction or at predefined stages. In the next stage and the given time measurement, the node measures counters for the congestion state, line rate and additional network attributes to be used in the destination selection and message transmission conditions definition. Next, the measured time and network attributes are used to calculate the destination based on the time slot and topology, while the message size, scheduled time of transmit and rate to be transmitted are based on network conditions such as congestion, routing and buffer utilization in the network. Then the scheduling and execution of the post of the messages to the network is performed. As discussed, software scheduling can be used to invoke the hardware for when to send the messages depending on the calculated features and attributes.

Figure 4:
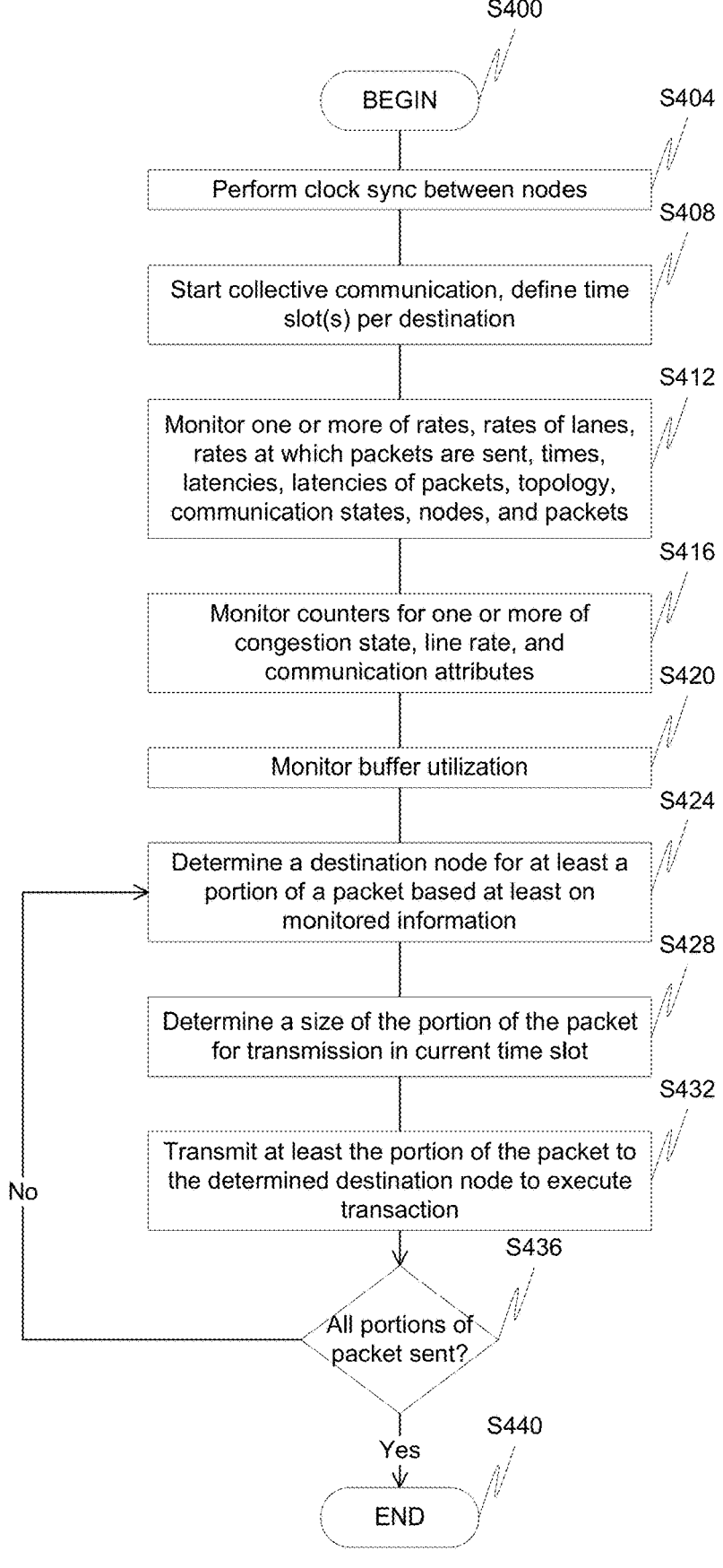
FIG. 4 is a flowchart illustrating an exemplary method of operating a collective processing system.

FIG. 4 is a flowchart illustrating a method for fully synchronized collective communication. Control begins in step S400 and continues to step S404. In step S404, clock synchronization between all nodes in the collective is performed. As discussed, it is critical that all nodes within the collective participating in this scheme be synchronized to a global clock using any one or more of the techniques mentioned herein. Next, in step S408, the collective communication commences with each time slot having an associated (predetermined) destination. These steps can occur before each transaction or at predetermined stages.

Then, in step S412, communications attributes or information about one or more of rates, rates of lanes, rates at which packets are sent, times, latencies, latencies of packets, topology, communication states, nodes, and packets are measured, monitored or acquired and stored. Control then continued to step S416.

In step S416, network attributes such as one or more of congestion state, line rate, and the like, are assessed and the values associated therewith stored to be used in determining a destination node for a packet. Optionally, in step S420, information regarding buffer utilization can also be stored for use in determining a destination node. Then, in step S424, a destination node for a packet is determined based on any of this stored information. Control then continues to step S428.

In step S428, a size of the portion of the packet for transmission in the current time slot is determined. When all portions of the time slot are filled, any remaining portion of the time slot can be occupied by a stall command to ensure system synchronization. Then, in step S432, the portion of the packet is transmitted to the determined destination node for processing. Control then continues to step S436.

In step S436, a determination is made whether all portions of the packet have been sent. If not, control jumps back to step S424 with control otherwise continuing to step S440 where the control sequence ends.

Figure 4A:
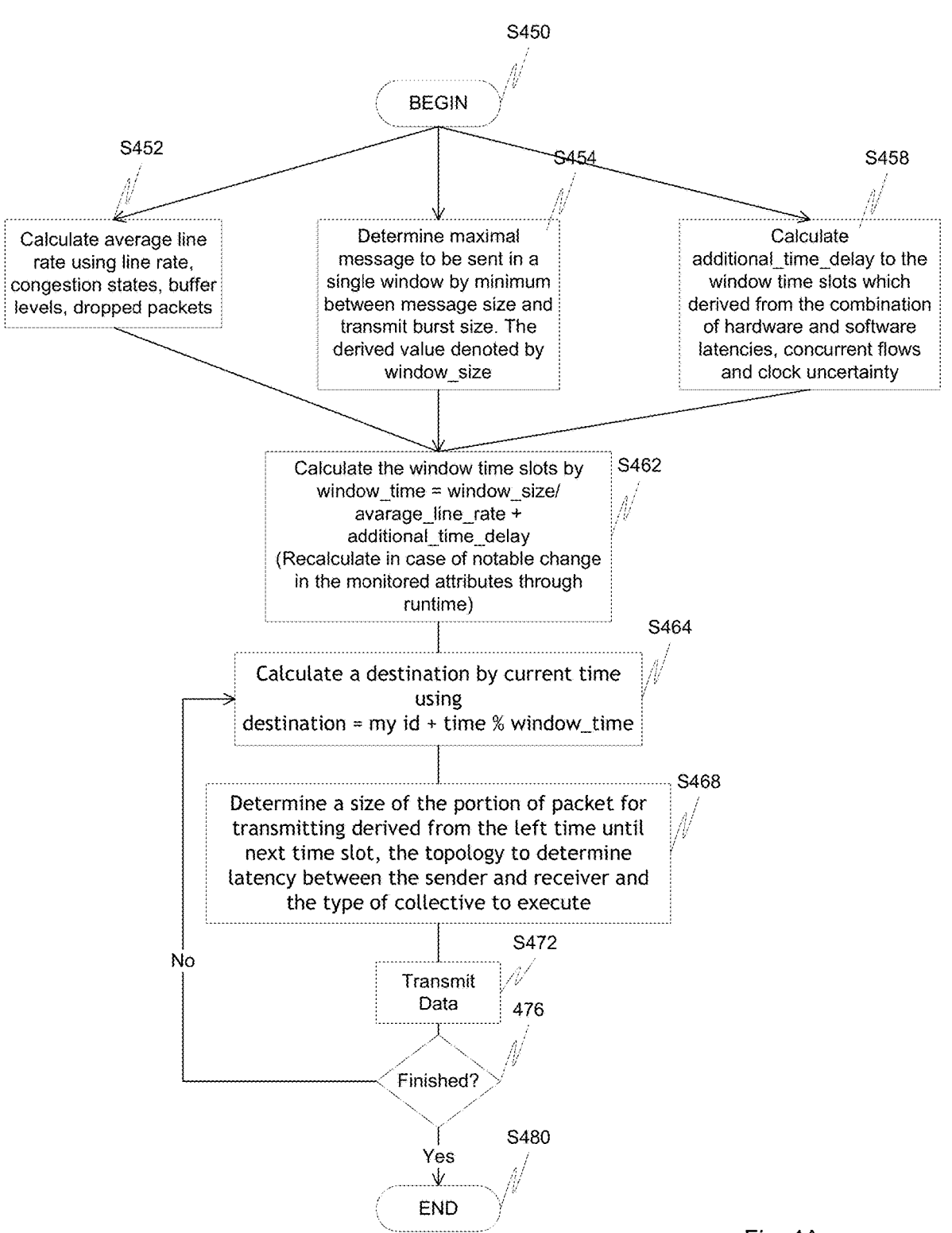
FIG. 4A is a flowchart illustrating an exemplary method of determining a destination and size of the data chuck for that destination.

FIG. 4A illustrates in greater detail one exemplary method for using one or more of the monitored attributes from Table 1 to calculate a destination and packet size for the transmitted data. It is to be appreciated that other combinations of attributes could be used and FIG. 4A simply presents an exemplary use case scenario. Specifically, control begins in step S450 and continues to steps S452, S454 and S458. These steps can be performed in parallel or serially. In Step S452, an average line rate can be calculated using line rate information, congestion state information, buffer level information and dropped packet information. In Step S454, a maximum message size to be sent is determined based on selecting the lesser of the message size and the transmit burst size. This is set as the maximum message size. In Step S458, an additional time delay is calculated for the window time slots, with this value being derived from a combination of hardware and software latencies, concurrent flow information and clock uncertainty data. Control then continues to step S462.

In step S462, the system calculates the window time slots in accordance with:

$$window\_time = window\_size / avarage\_line\_rate + additional\_time\_delay.$$

This window time value can be recalculated when, for example, there is notable change in one or more of the monitored attributes throughout runtime. For example, a threshold can be set, and if one or more of the monitored attributes reach the predefined threshold, a recalculation of the window time can be performed. Next, in step S464, a destination node for the current time slot can be determined in accordance with the destination node being chosen as the window ID plus the window size % time. Control then continues to step S468.

In step S468, a size of the packet to be transmitted is determined based on a time left until the next time slot, the latency between the sender and recipient and the type of collective to execute. The packet is then transmitted in step S472, with a check made in step S476 as to whether all data has been transmitted. If so, control continues to step S480 where control ends, with control otherwise jumping back to step S464.

Figure 5:
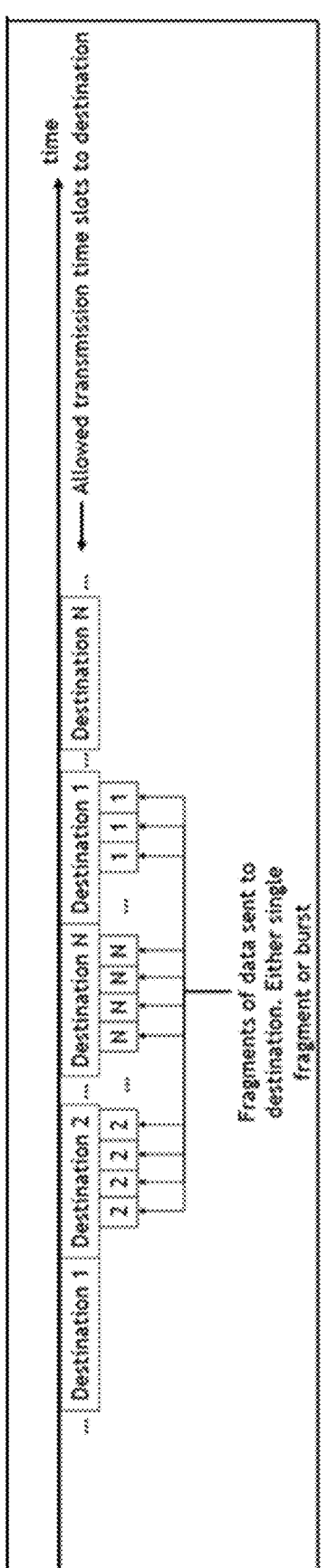
FIG. 5 illustrates exemplary timing and data transmission schemes.

FIG. 5 illustrates how, in the time domain, destination nodes are defined, and the associated fragments of data that are sent within each transmission time slot. For example, "Destination 2" includes four fragments of data "2," with these fragments being sendable in either a single fragment or in a burst mode. There can be up to N destinations and any number of fragments assigned to each time slot with the fuller the time slot the more efficient transmission becomes.

Figure 6:
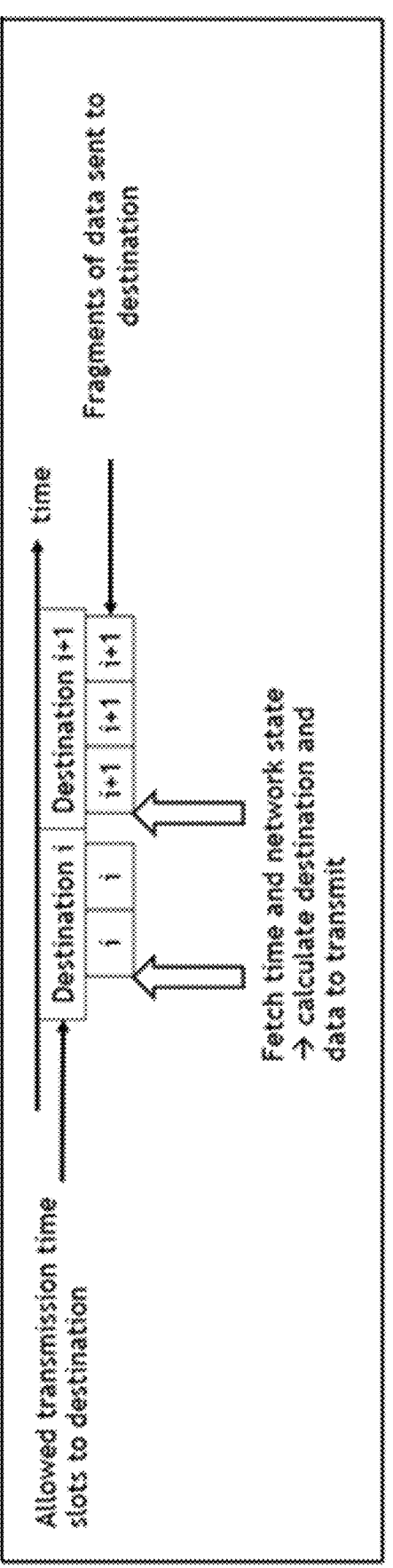
FIG. 6 illustrates exemplary timing and data transmission schemes.

FIG. 6 illustrates a similar concept to FIG. 5, with the addition of the inclusion of when the time and network state can be fetched, when this information is used to determine the destination node, and which data to transmit in the defined time slot. Here, as in FIG. 5, "Destination i" is allocated fragments i for sending and "Destination i+1" allocated fragments i+1, and so on.

Figure 7:
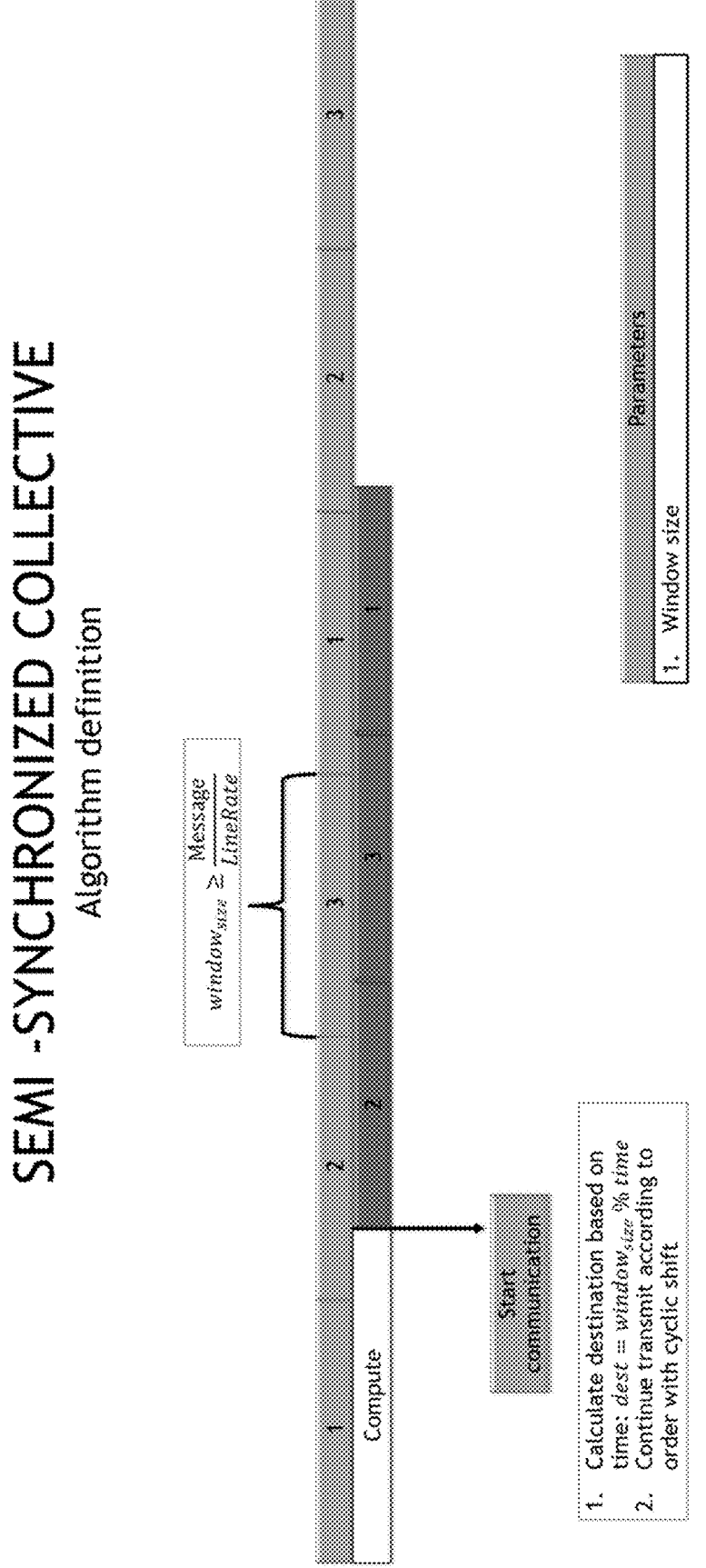
FIG. 7 illustrates in more detail a semi-synchronized collective.

To help appreciate the efficiencies gained with the improvements described herein, FIG. 7 illustrates the allocation within a semi-synchronized collective. Specifically, in the semi-synchronized collective, the window size is set as being greater to or equal than the message size divided by the line rate. The destination is then determined based on time, where the destination is equal to the window size as a percentage of time. Transmission continues according to an order with an added cyclic shift. As seen in FIG. 7, the data chunks are the same size and there is not complete synchronization between the time slots and the chunks.

Figure 8:
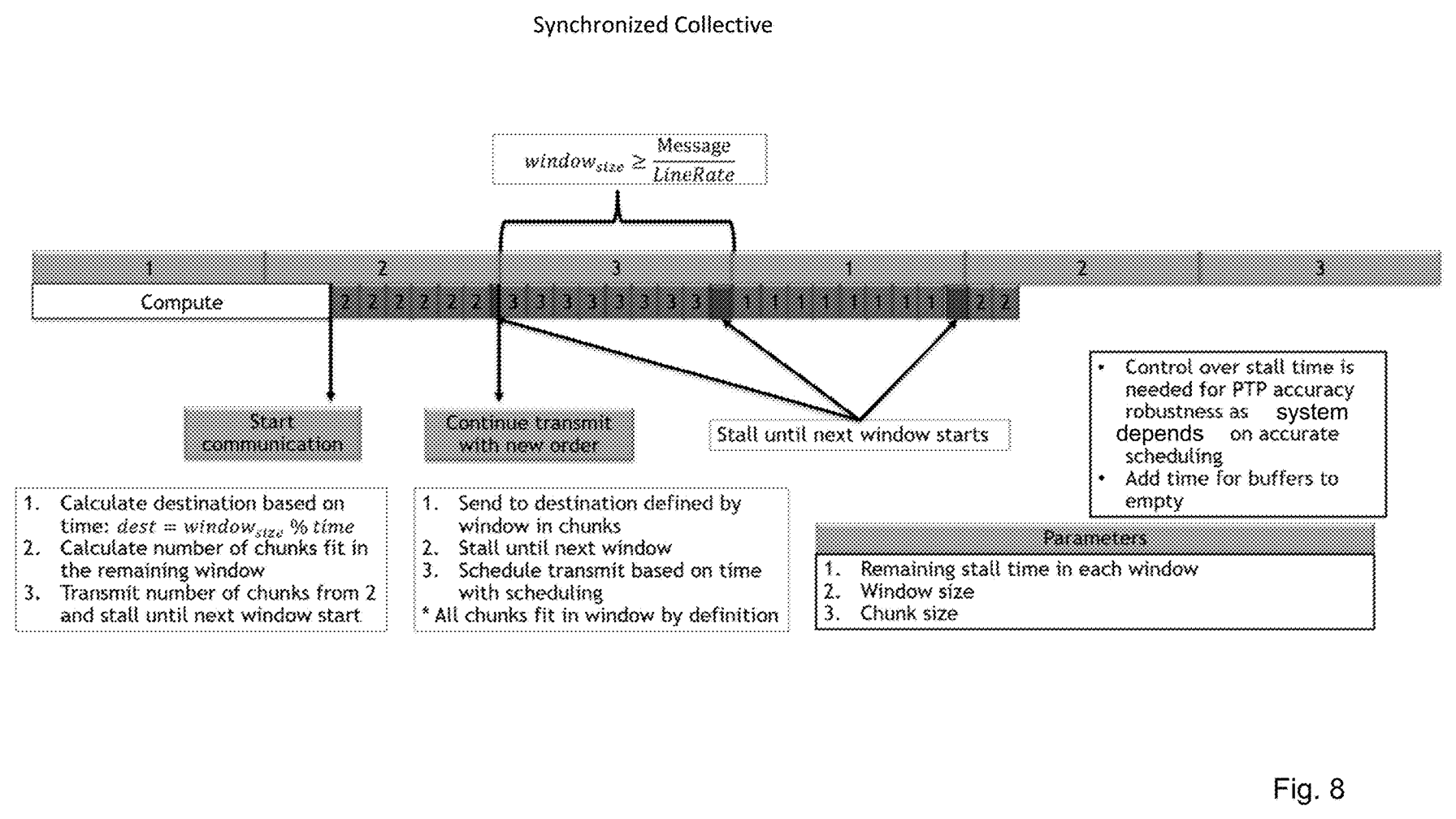

Contrast FIG. 7 with FIG. 8 where a similar diagram is shown for a synchronized collective utilizing the disclosed techniques. Here, by definition, all chunks are sent within the assigned window. Similar to FIG. 7, the window size is equal to or greater than the message size divided by the line rate. However, once communication starts, synchronization within the window is much improved. The destination is determined based on time, where the destination is equal to the window size as a percentage of time. A number of chunks that will fit in the remaining portion of the window is then determined. All of the chunks in the second window are transmitted, with any remaining unallocated portion of window 2 filled with a stall to complete the filling of the window. Once complete, window three and the associated chunks are transmitted with again any unused portion occupied by a stall block. In this synchronized scheme, the window defines the destination, and stalls are used such that all chunks are transmitted in the allocated window. Optionally, as shown, these stall times can be added to allow for buffers to empty with these stall times ensuring timing synchronization.

Figure 9:
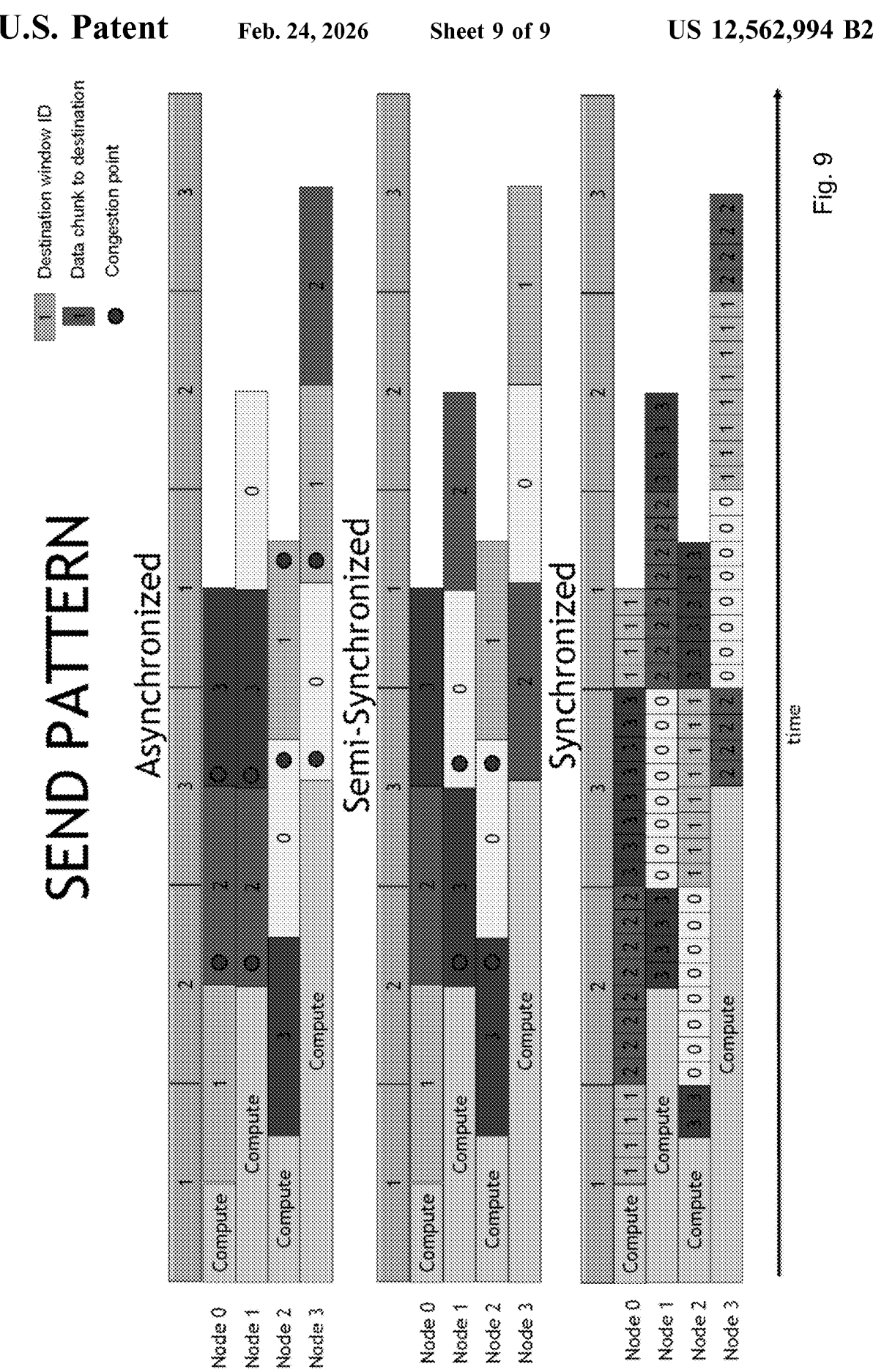
FIG. 9 illustrates a comparison between different collective configurations.

FIG. 9 illustrates a node-by-node comparison of the three techniques or send patterns in an exemplary use case: unsynchronized or one-sided/asynchronized, semi-synchronized and fully synchronized at four nodes, Node 0-Node 3. In FIG. 9, which is in the time-domain, each node has an associated destination window defined (destination window ID). Data chunks sent to that destination are then shown below the destination window. In the synchronized send portion of FIG. 9, all data chunks are aligned in time with the destination window and the windows are more fully utilized. This is in contrast to the one-sided and semi-synchronized examples shown where congestion points exist. In FIG. 9, the time slot's identification means what number of windows are referred to at a specific time. For example, node 2 will send to node 3 first, so the destination in window ID=1 for node 2 is 3.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. A system comprising:
   a least one compute node that is interconnected with a plurality of other compute nodes, the at least one compute node having:
      one or more processors enabling the at least one compute node to communicate with the plurality of other compute nodes via a collective communication flow, each of the one or more processors having associated memory;
      a clock;
      a scheduler, the scheduler monitoring one or more of rates, rates of lanes, rates at which packets are sent, times, latencies of packets, topology, communication states, nodes, and packets in the system;
      an attribute monitor that measures counters for one or more of congestion state, line rate, and communication attributes; and
      a packet scheduler that determines a destination compute node and data transmission characteristics for a packet based on information from the scheduler and the attribute monitor, and sends at least a portion of the packet to the destination compute node according to the transmission characteristics.

2. The system of claim 1, further comprising a data and time slot manager that manages an amount of data and a time slot for transmission of the at least the portion of the packet.

3. The system of claim 2, wherein the data and time slot manager coordinates collective communication in the system and defines one or more time slots for one or more destination compute nodes, and wherein the size of the at least a portion of the packet is further determined based on: (i) a time between time slots in the one or more time slots and/or (ii) a latency between the at least one node and the destination compute node.

4. The system of claim 1, wherein the clock is indirectly synchronized to single packet times between the at least one compute node and any other compute node in the system and the communication attributes include one or more of a switch buffer level, a number of pause frames, a number of dropped packets and an average packet size.

5. The system of claim 1, further comprising a buffer manager that monitors buffer utilization within the system, information about the buffer utilization also used by the packet scheduler to determine the destination compute node for the at least the portion of the packet.

6. The system of claim 1, wherein the system is a distributed, multi-node processing architecture.

7. The system of claim 1, wherein the system is part of a smart network interface card.

8. The system of claim 1, wherein the collective communication flow comprises at least one of all-to-all and all-gather and wherein the at least one compute node as well as the plurality of other compute nodes perform a collective operation using the collective communication flow by indirectly synchronizing to single packet times.

9. The system of claim 1, wherein the collective communication flow enables one or more collective operations to be performed.

10. A system comprising:
   a scheduler, the scheduler monitoring one or more of rates, rates of lanes, rates at which packets are sent, times, latencies of packets, topology, communication states, nodes, and packets;
   an attribute monitor that measures counters for one or more of congestion state, line rate, and communication attributes;
   a packet scheduler that:
      determines a destination compute node and data transmission characteristics for a packet based on information from the scheduler and the attribute monitor, and
      triggers hardware to send at least a portion of the packet to the destination compute node according to the transmission characteristics, wherein the destination compute node is one of a plurality of compute nodes that communicate via a collective communication flow, and wherein the transmission characteristics include at least one of a size of the at least a portion of the packet, a time to transmit the at least a portion of the packet, and a rate at which each portion of the packet is to be transmitted.

11. The system of claim 10, further comprising a time slot manager that manages an amount of data and a time slot for transmission of the at least the portion of the packet.

12. The system of claim 10, wherein the time slot manager defines one or more time slots for one or more destination compute nodes.

13. The system of claim 10, further comprising a clock which is indirectly synchronized amongst the plurality of compute nodes to single packet times.

14. The system of claim 10, further comprising a buffer manager that monitors buffer utilization, information about the buffer utilization also used by the packet scheduler to determine the destination compute node for the at least the portion of the packet.

15. The system of claim 10, wherein information regarding destination compute node availability is provided to the packet scheduler to assist with the determination of the destination compute node.

16. The system of claim 10, wherein the packet scheduler causes the hardware to send the portions of the packet until all portions are sent to their respective destinations.

17. A method comprising:
   monitoring one or more of rates, rates of lanes, rates at which packets are sent, times, latencies, latencies of packets, topology, communication states, nodes, and packets;
   measuring counters for one or more of congestion state, line rate, and communication attributes;
   determining a destination compute node and data transmission characteristics for a packet based on the monitored and measured information, wherein the destination compute node is one of a plurality of compute nodes that communicate via a collective communication flow, and wherein the transmission characteristics include at least one of a size of the at least a portion of the packet, a time to transmit the at least a portion of the packet, and a rate at which each portion of the packet is to be transmitted; and causing hardware to send at least a portion of a packet to the destination node according to the transmission characteristics.

18. The method of claim 17, further comprising monitoring buffer utilization, information about the buffer utilization also used to determine the destination compute node for the at least the portion of the packet.

19. The method of claim 17, further comprising managing an amount of data and a time slot for transmission of the at least the portion of the packet.

20. The method of claim 17, further comprising indirectly synchronizing a clock between the plurality of compute nodes to single packet times.

21. The method of claim 17, further comprising sending the portions of the packet until all portions are sent to their respective destinations.

22. The method of claim 17, further comprising, prior to sending the at least the portion of the packet to the destination compute node, defining one or more time slots for one or more destination compute nodes.

23. A system comprising:
a data and time slot manager that manages one or more of an amount of data and a time slot for sending of at least a portion of a packet to a destination compute node, wherein the destination compute node is one of a plurality of compute nodes that communicate via a collective communication flow; and a packet scheduler, cooperating with the data and time slot manager, that determines the destination compute node and data transmission characteristics for a packet based on one or more of communications attributes and network attributes within the system, and sends at least a portion of the packet to the destination compute node according to the transmission characteristics.

24. The system of claim 23, wherein the data and time slot manager coordinates collective communication in the system and defines one or more time slots for one or more destination compute nodes.

25. The system of claim 23, wherein the one or more of communications attributes and network attributes includes one or more of rates, rates of lanes, rates at which packets are sent, times, latencies, latencies of packets, topology, communication states, nodes, packet congestion state, and buffer states.

\* \* \* \* \*